United States Patent
Hou et al.

(10) Patent No.: US 12,025,541 B2
(45) Date of Patent: Jul. 2, 2024

(54) MASS PRODUCTION MANUFACTURING METHOD FOR TISSUE CHIP

(71) Applicant: Zhongshan Hospital, Fudan University, Shanghai (CN)

(72) Inventors: Yingyong Hou, Shanghai (CN); Chen Xu, Shanghai (CN); Dongxian Jiang, Shanghai (CN); Qi Song, Shanghai (CN); Haixing Wang, Shanghai (CN); Yalan Liu, Shanghai (CN); Jie Huang, Shanghai (CN); Lingli Chen, Shanghai (CN); Rongkui Luo, Shanghai (CN); Qin Hu, Shanghai (CN); Yuan Ji, Shanghai (CN); Shaohua Lu, Shanghai (CN); Jun Hou, Shanghai (CN); Lijuan Luan, Shanghai (CN); Jieakesu Su, Shanghai (CN)

(73) Assignee: ZHONGSHAN HOSPITAL, FUDAN UNIVERSITY, Shanghai (CN)

( * ) Notice: Subject to any disclaimer, the term of this patent is extended or adjusted under 35 U.S.C. 154(b) by 923 days.

(21) Appl. No.: 17/078,372

(22) Filed: Oct. 23, 2020

(65) Prior Publication Data

US 2021/0041333 A1 Feb. 11, 2021

Related U.S. Application Data

(63) Continuation of application No. PCT/CN2019/083579, filed on Apr. 20, 2019.

(30) Foreign Application Priority Data

Apr. 25, 2018 (CN) .......................... 201810381966.2

(51) Int. Cl.
*G01N 1/28* (2006.01)
*G01N 1/36* (2006.01)

(52) U.S. Cl.
CPC ..... *G01N 1/286* (2013.01); *G01N 2001/2873* (2013.01); *G01N 2001/368* (2013.01)

(58) Field of Classification Search
None
See application file for complete search history.

(56) References Cited

U.S. PATENT DOCUMENTS

| | | | | |
|---|---|---|---|---|
| 2008/0318805 A1* | 12/2008 | Fulton et al. | ............ | G01N 1/36 506/40 |
| 2014/0155294 A1 | 6/2014 | Lee et al. | | |

FOREIGN PATENT DOCUMENTS

| CN | 201186924 Y | | 1/2009 |
|---|---|---|---|
| CN | 101556224 A | | 10/2009 |
| CN | 101694429 A | * | 4/2010 |
| CN | 101694429 A | | 4/2010 |
| CN | 103091151 A | * | 5/2013 |
| CN | 103091151 A | | 5/2013 |
| CN | 108593380 A | | 9/2018 |

OTHER PUBLICATIONS

Colón-Caraballo et al., "Effects of histone methyltransferase inhibition in endometriosis," Biol. Reprod. 2018, 99(2):293-307, published Feb. 2, 2018. (Year: 2018).*

* cited by examiner

*Primary Examiner* — Kaijiang Zhang
(74) *Attorney, Agent, or Firm* — IPRO, PLLC

(57) ABSTRACT

A manufacturing method for mass production for a tissue or cell microarray, which is characterized in comprising: using a molding device to mold tissue particles, cultivated cells or collected exfoliated cells (such as exfoliated cells from pleural effusion and ascites), forming the tissue particles from blended fresh tissue, tissue fixed by formalin or another solvent (such as alcohol and so on) or a tissue block embedded in paraffin (blended by a tissue blender), implanting the molded tissue or cells cores in a receptor wax or adhering the molded tissue or cells cores onto a metal plate, and then slicing to obtain a tissue or cell microarray.

6 Claims, No Drawings

MASS PRODUCTION MANUFACTURING METHOD FOR TISSUE CHIP

TECHNICAL FIELD

The present invention relates to a manufacturing method of mass production of tissue microarrays, which is used for preparing ultra-high-yield tissue microarrays, and belongs to the technical field of tissue microarrays.

BACKGROUND

Tissue microarray technology is the development and extension of gene chip technology. Like cell microarrays, protein microarrays, and antibody microarrays, it belongs to a special biochip technology. The tissue microarray technology can arrange dozens or even thousands of specimens of different individuals in a pre-designed sequence on a slide for analysis and research, and is a high-throughput and multi-sample analysis tool. The tissue microarray technology enables researchers to simultaneously analyze hundreds or even thousands of samples as well as carry out the researches on specific genes or their related expression products. This technology can be combined with detective technologies for DNA, RNA, protein and, antibody and combined with traditional pathology, histochemistry and immunohistochemistry technologies, so that research can be is carried out at three levels of genes, gene transcription and biological functions. This has practical significance and broad market prospects in the research and development of human genomics, especially the researches on the relationships between genes, proteins and diseases, verification of disease-related genes, development and screening of new drugs, preparation and screening of new antibodies, the molecular diagnosis of diseases, tracking and prognosis of the treatment process, and so on.

Biotechnology companies such as Clontech and Stratagene of the United States have carried out the development and sold the products of human and animal tissue microarray, but due to the small quantity, high price, and single variety, it cannot meet the needs of medical scientific research, as well as the research and development of the pharmaceutical industry. In April 2001, LifeSpan Biosciences Inc. of the United States established a gene expression database for normal and diseased tissues. Tissue Informactics Inc. of the United States used animal tissue microarray technology to screen drug toxicology and find new drug action sites. In addition, Japan, the United Kingdom and other countries established national clinical histopathological databases.

China's research on the tissue microarray technology is progressing rapidly. In October 2001, the Ministry of Science and Technology of China listed the tissue microarray technology as a major project of the "15-Year Plan" of National Science and Technology Research and Development in the Western Region, and this project had been officially established in Xi'an. The project is divided into 7 sub-projects, including tissue microarray technology, tissue microarray biological information database, automated tissue microarray instruments, automatic analysis devices, tissue microarray related technologies and reagents, and tissue microarray practical application technology, which laid a foundation for the simultaneous development of related technologies in China and the world.

After more than ten years of development, at present, the preparation of tissue microarrays mainly depends on a mechanized microarray preparation apparatus. The preparation apparatus comprises an operating platform, a special perforating and sampling device and a positioning system. The perforating and sampling device samples a donor tissue wax block, and at the same time, can also perforate a receptor wax with the same hole diameter as a sampling diameter, and both of them can be accurately positioned. The positioning device of the preparation instrument can linearly move a puncture needle or the receptor wax, as a result, tissue microarray wax blocks with the same hole diameter, hole distance and hole depth can be manufactured. It is transferred and fixed to a siliconized and gelled glass slide through a slice assistant system to become a tissue microarray. Depending on the sample diameter (0.2-2.0 mm), more than 40 to 2000 tissue specimens can be arranged on a 45 mm×25 mm slide. Generally, tissue microarrays are divided into low-density microarrays (<200 points), medium-density microarrays (200 to 600 points) and high-density microarrays (>600 points) according to the number of samples. The commonly used tissue microarray includes 50 to 800 tissue specimens. According to different research purposes, the microarray types can be divided into more than 10 types, such as tumor tissue microarrays, normal tissue microarrays, single or composite microarrays, and specific pathological types.

However, the preparation of tissue microarrays according to the above-mentioned method has the following disadvantages. Firstly, the existing tissue microarray has a very high manufacturing cost. In addition to the high cost of special instruments and equipment (hundreds of thousands of yuan), the cost of manufacturing one tissue microarray is more than 10,000 yuan, and the unit price of each slice is 50 to 100 yuan. Secondly, sampling can only be performed on existing wax blocks, and the source of tissue is limited. Thirdly, according to the existing equipment and method, microarray spots began to be lost after only about 50 slices, because sampling is carried out by point holes on the original wax block, the tissue thickness is limited, and the thickness is also inconsistent. Fourthly, although the high-density microarray has a large throughput, it is difficult to provide information on the tissue structure due to the small size of each piece of tissue. Fifthly, only paraffin tissue can be used to prepare the tissue microarrays, but fresh tissues and cultivated cells cannot be used to prepare the tissue microarrays. Sixthly, funds and experimental conditions are allowed only in large-scale research institutions to conduct related research on tissue microarrays, which is difficult to promote. Seventhly, the existing tissue microarray method cannot achieve mass production, and it is difficult to meet the needs of a large-scale clinical and scientific research.

SUMMARY

The objective of the present invention is to develop a simple manufacturing method for mass production of tissue microarrays, for preparing low-density and medium-density tissue microarrays, which takes sample throughput, tissue structure, fresh tissue, tissue fixed with formalin or another solvent (such as alcohol), tissues filled with paraffin or another support agents, cultivated cells and so on in serious consideration, especially the high yield and other requirements of tissue microarrays, so as to make full use of the tissue microarray technology.

In order to achieve the above objective, the technical proposal of the present invention is to provide a manufacturing method for mass production of tissue or cell microarrays, comprising: using a molding device to mold tissue particles, cultivated cells or collected exfoliated cells (such as exfoliated cells from pleural effusion and ascites); the tissue particles mentioned above could be formed through fresh tissue crushed, tissues fixed with formalin or another solvent (such as alcohol, etc.) or a tissue blocks embedded in paraffin which are blended by tissue blender; implanting the molded tissue or cells cores in a receptor wax or bonding the molded tissue or cells cores onto a metal plate; and slicing to obtain the tissue or cell microarrays.

The tissue particle being blended by the tissue blender has an irregular shape, but still retains a tissue structure.

Preferably, the tissue particle has a size of 0.01 cm to 0.3 cm.

Preferably, a method for molding the tissue particles formed through the tissues fixed with formalin or another solvent, blended by the tissue blender, comprises: collecting and using the tissue particles formed through tissues fixed with formalin or another solvent (blended by the tissue blender), wrapping with cotton cloth, numbering and then dehydrating and dipping in wax; turning on an embedding machine, putting the tissue particles on an ironing table of the embedding machine, and melting paraffin at 50° C. to 70° C. to obtain the tissue particles to be molded; placing a molding tube into a groove on the ironing table; putting the tissue particles into the molding tube; then adding the melted paraffin to fill gaps among the tissue particles in the molding tube; and transferring the molding tube (filled with the tissue particles and the paraffin in the gaps) from the ironing table to a freezing table of the embedding machine for polymerization, to obtain the molding tube mounted with molded tissue cores, numbering and storing them; then peeling off the molding tube before use, to obtain the molded tissue cores.

More preferably, the molding tube is a cylindrical plastic tube, which can be divided into small pieces (with a length of 1 to 2 cm and a diameter of 0.1 to 0.3 cm) for convenient usage and storing; or the molding tube can also be a cuboid-molded molding tube with a length of 1 to 2 cm, a width of 0.1 to 0.5 cm, and a height of 0.1 to 0.5 cm.

More preferably, the molding tube has a length of 2 cm and a diameter of 0.3 cm. The shape, size and inner diameter can also be adjusted as needed.

More preferably, the tissue core has a usable length of 1 cm to 1 m, preferably 2 cm, and it is expected that 2000 pieces can be continuously sliced.

Preferably, a method of implanting the molded tissue or cells cores into the receptor wax comprises: putting the receptor wax on a glass plate, and placing it in a constant temperature oven at 50° C. to 70° C. for 20 to 40 min to soften the receptor wax; recording the number of these tissue or cells cores at a corresponding position on a positioning plate or positioning paper, and using a guide needle to drill at a corresponding position of the receptor wax; implanting the molded cores one by one; after the implantation is completed, making an implanted side face to the glass plate, and putting it in the constant temperature oven at 50° C. to 70° C. for 1 to 5 h for polymerization; placing the receptor wax and the glass plate in a refrigerator at 2° C. to 6° C. at the same time; and then removing the glass plate to obtain the receptor wax implanted with the tissue or cells corers; and slicing in a direction parallel to the glass plate to obtain the tissue or cell microarrays.

Preferably, a method for bonding the molded tissue or cells cores on the metal plate comprises: placing the metal plate in a refrigerator, the metal plate being marked with positioning points; taking out the molded tissue or cells cores; recording the positions on a positioning plate; applying a small amount of an embedding agent on one end of the molded cores, and bonding to the positioning points on the metal plate one by one; thereafter, filling gaps among the molded cores with the embedding agent; freezing the embedding agent and the molded tissues or cells into a whole; and slicing with a freezing microtome to obtain the tissue or cell microarrays.

More preferably, different combinations of tissue or cells cores can be selected to be implanted into the receptor wax as needed.

Preferably, a method for molding the tissue particles formed through the tissues embedded in paraffin by blending them with the tissue blender comprises: collecting the tissue particles formed through the tissues embedded in paraffin by blending them with the tissue blender, and placing a molding tube into a groove on an ironing table of an embedding machine; putting the tissue particles into the molding tube, and adding melted paraffin to fill gaps among the tissue particles in the molding tube; transferring the molding tube filled with the tissue particles and the paraffin in the gaps from the ironing table to a freezing table of the embedding machine for polymerization, to obtain the molding tube mounted with molded tissue cores, numbering and storing them, and then peeling off the molding tube before use to obtain the molded tissue cores.

Preferably, a method for molding the tissue particles formed through the blended fresh tissue by using the tissue blender comprises: moving the tissue particles onto a fresh tissue particle molding plate, the fresh tissue particle molding plate is an elastic plastic plate with grooves; pipetting the fresh tissue particles into the grooves; and placing the fresh tissue particle molding plate in a refrigerator at −15° C. to −25° C., to form fresh tissue cryopreservation columns, and numbering them for later use.

More preferably, the groove has a length of 2 cm, a width of 0.2 cm to 0.5 cm, and a height of 0.2 cm to 0.5 cm.

Preferably, a method for molding the cultivated cells or collected exfoliated cells with the molding device comprises: directly fixing the cultivated cells or collected exfoliated cells by using a conventional method, dehydrating and dipping in wax; placing a molding tube into a groove on an ironing table of an embedding machine; placing the wax-dipped cells into the molding tube, and adding melted paraffin to fill gaps; transferring the molded tube from the ironing table to a freezing table of the embedding machine for polymerization to obtain the molded cells, and then numbering and storing them.

Preferably, the molding tube can have different shapes and specifications, and the groove of the tissue microarray embedding machine can have different sizes.

Preferably, the receptor wax is square, round or other shapes.

In the present invention, on the basis that a block of tissue is crushed into tissue particles, and the tissue particles still retain a certain tissue structure, the characteristics of paraffin that is easy to dissolve and polymerize are utilized, a small amount of paraffin is first used to bond the tissue particles together, and the tissue particles are molded into a cylindrical mold or other shapes as spare tissue cores for preparing tissue microarrays. Alternatively, the fresh tissue particle molding plate is used to freeze and mold the tissue particles as spare tissue cores for preparing fresh tissue microarrays.

The present invention has the advantages of low cost, convenience, rapidness, significantly improved yield, and diverse materials. Moreover, it can not only be used for paraffin tissues, but also for fresh tissues and cultivated or exfoliated cells, so that it can be popularized in each department of pathology as well as relevant research units.

The mold of the tissue core produced is not limited, and it can be molded into a long strip, rectangular, square, cylindrical, or tubular shape. The sizes of the tissue core and the tissue microarray can be determined as needed, and 20 to 100 tissue cores may be arranged in the area of 50 mm×25 mm, which can meet the research needs. It may also be combined to prepare a positive control microarray for immunohistochemistry with 1 to 10 tissue cores arranged. The height of the tissue microarray may also be determined as needed. 500 to 2000 slices may be obtained from a tissue microarray with a height of 5 mm to 20 mm, which is much higher than the yield of 50 slices of the existing tissue microarray. It is about 10 to 40 times. In the existing tissue microarray preparation method, the tissue core loss gradually appeared in the slicing process, whereas the tissue microarray prepared by this method has the same core length, and thus there will be no loss of the tissue core during the subsequent slicing. Taking a piece of tissue 2 cm×2 cm×0.2 cm as an example, according to the existing tissue microarray sampling method, at most 10 points can be taken, and 500 to 2000 microarrays can be obtained with each point being cut into 50 to 200 microarrays; and if it is blended into tissue particles, then 5 to 10 tissue columns of 2 cm×0.3 cm×0.3 cm can be obtained, and a total of 10,000 to 20,000 tissue microarrays including this piece of tissue can be obtained. Taking placental tissue as an example, the amount of tissue is sufficient, and after it is blended into tissue particles, 1,000 tissue columns can be manufactured conveniently and quickly, and 2 million tissue microarrays including the placental tissue can be obtained. Therefore, the method of tissue particles breaks through the bottleneck of the mass production of tissue microarrays, and omits the expensive equipment of tissue microarray sampling machine. Its cost is much lower than that of the existing manufacturing method, and it opens up a convenient new method for the popularization and application of the tissue microarrays.

The present invention has the advantages of low cost, convenience, rapidness, mass production, and diverse shapes. It may be used for fresh tissue, fixed tissue, tissue embedded in paraffin, cultivated cells or exfoliated cells such as exfoliated cells from pleural effusion and ascites, and can be widely used in each department of pathology as well as relevant research units.

DETAILED DESCRIPTION

The implementations of the present invention will be clearly and completely described below in conjunction with embodiments. Obviously, the described embodiments are only used to illustrate a part of the embodiments of the present invention, and should not be regarded as limiting the scope of the present invention. If specific conditions are not specified in the embodiments, the routine conditions or the conditions recommended by the manufacturers shall be followed. If a manufacturer of a reagent or instrument is not indicated, it is regarded as a conventional product that can be purchased on the market. The preferred embodiments of the present invention are only described as above, but are not intended to limit the present invention, and any modification, equivalent substitution, improvement, etc. within the spirit and principle of the present invention should be included within the protection scope of the present invention.

Embodiment 1

A manufacturing method for mass production of tissue microarrays comprises the following specific steps:

Step 1: required tissue is retained when pathological materials are taken. It is fixed with formalin and numbered; a tissue blender is used to crush it to form tissue particles. The tissue particles are collected and wrapped with cotton cloth. By following the routine tissue processing procedures of the department of pathology, they are numbered and then dehydrated and dipped in wax.

Step 2: an embedding machine is turned on. The tissue particles are put on an ironing table of the embedding machine. Paraffin on the tissue particles is to be melted at 60° C. to obtain the tissue particles to be molded. A molding tube is placed into a groove on the ironing table of the tissue microarray embedding machine. The molding tube is a cylindrical plastic tube with a length of 2 cm and a diameter of 0.3 cm. The tissue particles to be molded are put into the molding tube, and a small amount of melted paraffin is added to fill gaps among the tissue particles. At least 5 tubes of molded tissue particles are prepared at a time according to the amount of tissue.

Step 3: the molding tube filled with tissue particles and paraffin in the gaps is transferred from the ironing table to a freezing table of the tissue microarray embedding machine for polymerization to obtain the molding tube with a molded tissue core, and it is numbered and stored; and the molding tube is peeled off before use, and the molded tissue core is obtained.

Step 4: a 50 mm×25 mm receptor wax is put on a glass plate, and it is placed in a constant temperature oven at 50° C. for 30 min (with an implantation side of microarray facing up) to soften the receptor wax. A designated number of the molded tissue is recorded on a corresponding position of a positioning plate or positioning paper, a guide needle is used to drill at the corresponding position of the receptor wax, and the molded tissue or cells are implanted one by one.

Step 5: after the implantation is completed, an implantation side of the receptor wax is made to face the glass plate, and they together are placed in the constant temperature oven at 56° C. for polymerization for 60 min. After the polymerization is completed, the receptor wax and the glass plate are placed in a refrigerator at 4° C. simultaneously. The glass plate is removed to obtain the receptor wax embedded with the tissue or cells, and the tissue microarrays are obtained by slicing along a direction parallel to the glass plate. 5 tissue cores from the same disease sample can be processed in the preparation. As a result, 10,000 microarrays can be obtained.

Embodiment 2

A manufacturing method for mass production of tissue microarrays comprises the following specific steps:

Step 1: fresh tissues are retained when taking pathological materials, and it is numbered and blended into tissue particles by using a tissue blender.

Step 2: the tissue particles are moved into grooves of a fresh tissue particle molding plate with a pipette. The fresh tissue particle molding plate is an elastic plastic plate with grooves on the plastic plate. The groove has a length of 2 cm, a width of 0.3 cm, and a height of 0.3 cm. The fresh tissue particle molding plate is placed in a refrigerator at −20° C., and the tissue particle are frozen and molded into fresh tissue cryopreservation columns.

Step 3: the elasticity of the fresh tissue particle molding plate is used to loosen the molded fresh tissue cores. They are taken out with tweezers and numbered, and the fresh tissue cores are frozen for later use.

Step 4: a metal plate of 50 mm×25 mm is placed in the refrigerator at −20° C. The metal plate is marked with positioning points. The fresh tissue cores are taken out. Positions are recorded on a positioning plate. A small amount of an embedding agent (OCT embedding agent available from Sakura Finetek Japan Co, Ltd, Tokyo, 135-0007) is applied on one end of the fresh tissue cores, and they are bonded to the positioning points of the metal plate one by one. Thereafter, gaps among the fresh tissue cores are filled with the embedding agent. The embedding agent and the tissue cores are frozen into complete fresh tissue microarrays. The fresh tissue microarrays are obtained by slicing with a freezing microtome. 20 tissue cores from the same disease sample can be processed in the preparation of tissue microarrays. As a result, 40,000 microarrays can be obtained.

Embodiment 3

A manufacturing method for mass production of tissue microarrays comprises the following specific steps:

Step 1: exfoliated cells from pleural effusion are obtained by centrifugation. They are directly fixed with formalin, and wrapped with cotton cloth. By following the routine tissue processing procedures of the department of pathology, they are dehydrated and dipped in wax.

Step 2: the wax-dipped exfoliated cells are put on an ironing table of an embedding machine. Paraffin on the tissue particles is to be melted at 62° C. A molding tube is placed into a groove on the ironing table of the embedding machine. The molding tube is a cuboid-shaped molding tube with a length of 2 cm, a width of 0.2 cm, and a height of 0.2 cm. The wax-dipped cells are placed in the molding tube, and the melted paraffin is added to fill gaps. 10 cores of cell microarrays are prepared at a time according to the amount of cells.

Step 3: the molding tube is transferred from the ironing table to a freezing table of the embedding machine for polymerization to obtain the molded cells, and they are numbered and stored.

Step 4: a 50 mm×25 mm receptor wax is put on a glass plate, and it is placed in a constant temperature oven at 52° C. for 30 min with a side of microarray implantation facing up to soften the receptor wax. Cell numbers are recorded on corresponding positions of a positioning plate or positioning paper. A guide needle is used to drill at the corresponding positions of the receptor wax. A plastic tube of an outer layer of one molded cell core is peeled off. Different cell cores are implanted into the receptor wax one by one.

Step 5: after the implantation is completed, an implantation side of the receptor wax is made to face the glass plate, and they together are placed in the constant temperature oven at 56° C. for polymerization for 60 min. After the polymerization is completed, the receptor wax and the glass plate are placed in a refrigerator at 4° C. at the same time. The glass plate is removed to obtain the receptor wax embedded with the cells, and the cell microarrays are obtained by slicing along a direction parallel to the glass plate. 10 tissue cores from the same disease sample can be processed in the preparation of tissue microarrays. As a result, 20,000 microarrays can be obtained.

What is claimed is:

1. A manufacturing method for mass production of tissue microarrays, comprising:

using a molding device to mold tissue particles, cultivated cells or collected exfoliated cells, wherein the tissue particles are formed through blended fresh tissue, tissues fixed with formalin or another solvent or a paraffin embedded tissues which are blended by a tissue blender;

implanting the molded tissue or cells cores in a receptor wax; and then slicing to obtain the tissue microarrays;

wherein molding the tissue particles formed through the blended tissues fixed with formalin or another solvent comprises: collecting and using the tissue particles formed through blended tissue fixed with formalin or another solvent (using the tissue blender), wrapping them with cotton cloth, numbering and then dehydrating and dipping them in wax; turning on an embedding machine, putting the tissue particles on an ironing table of the embedding machine, and paraffin will be melting at 50° C. to 70° C. to obtain the tissue particles to be molded; placing a molding tube into a groove on the ironing table of the embedding machine; putting the tissue particles into the molding tube, and adding the melted paraffin to fill gaps among the tissue particles in the molding tube; and transferring the molding tube filled with the tissue particles and the paraffin in the gaps from the ironing table to a freezing table of the embedding machine for polymerization, to obtain the molding tube mounted with molded tissue cores, numbering and storing it, and then peeling off the molding tube before use so as to obtain the molded tissue cores; or wherein molding the tissue particles formed through the blended tissues embedded in paraffin comprises: collecting the tissue particles formed through the tissues embedded in paraffin which are blended by the tissue blender, and placing a molding tube into a groove on an ironing table of an embedding machine; putting the tissue particles into the molding tube, and adding melted paraffin to fill gaps among the tissue particles in the molding tube; transferring the molding tube filled with the tissue particles and the paraffin in the gaps from the ironing table to a freezing table of the embedding machine for polymerization, to obtain the molding tube mounted with molded tissue cores, numbering and storing them, and then peeling off the molding tube before use so as to obtain the molded tissue cores; or wherein molding the tissue particles formed through the blended fresh tissues which are blended by the tissue blender comprises: moving the tissue particles onto a fresh tissue particle molding plate with a pipette, the fresh tissue particle molding plate being an elastic plastic plate with grooves; pipetting the fresh tissue particles into the grooves; and placing the fresh tissue particle molding plate in a refrigerator at −15° C. to −25° C. to form fresh tissue cryopreservation columns, and numbering them for later use; or wherein molding the cultivated cells or collected exfoliated cells with the molding device comprises: directly fixing the cultivated cells or collected exfoliated cells, dehydrating and dipping them in wax; placing a molding tube into a groove on an ironing table of an embedding machine; placing the wax-dipped cells into the molding tube, and adding melted paraffin to fill gaps; transferring the molded tube from the ironing table to a freezing table of the embedding machine for polymerization to obtain the molded cells, and then numbering and storing them.

2. The manufacturing method for mass production of the tissue microarrays of claim 1, wherein the tissue particles blended by the tissue blender have an irregular shape, but still retain tissue structures.

3. The manufacturing method for mass production of the tissue microarrays of claim 1, wherein the tissue particles have a size of 0.01 cm to 0.3 cm.

4. The manufacturing method for mass production of the tissue microarrays of claim 1, wherein implanting the molded tissue or cells cores into the receptor wax comprises:
   putting the receptor wax on a glass plate, and placing them in a constant temperature oven at 50° ° C. to 70° C. for 20 to 40 min to soften the receptor wax;
   recording the numbers of these cores at corresponding positions on a positioning plate or positioning paper, and using a guide needle to drill at corresponding positions of the receptor wax;
   implanting the molded cores one by one;
   after the implantation is completed, making an implanted side face to the glass plate, and putting it in the constant temperature oven at 50° C. to 70° C. for 1 to 3 h for polymerization;
   placing the receptor wax and the glass plate in a refrigerator at 2° C. to 6° C. at the same time;
   then removing the glass plate to obtain the receptor wax implanted with the tissue or cells cores; and
   slicing in a direction parallel to the glass plate to obtain the tissue microarrays.

5. The manufacturing method for mass production of the tissue microarrays of claim 1, further comprising bonding the molded tissue or cells cores on a metal plate by:
   placing the metal plate in a refrigerator, the metal plate being marked with positioning points;
   then taking out the molded tissue or cells;
   recording positions on a positioning plate;
   applying a small amount of an embedding agent on one end of the molded tissue or cells, and bonding to the positioning points on the metal plate one by one;
   filling gaps among the molded cores with the embedding agent;
   freezing the embedding agent and the molded cores as a whole; and
   slicing with a freezing microtome to obtain the tissue or cell microarrays.

6. The manufacturing method for mass production of the tissue microarrays of claim 1, wherein the molding tube is a cylindrical plastic tube with a length of 1 to 2 cm and a diameter of 0.1 to 0.3 cm, or the molding tube can also be a cuboid-shaped molding tube with a length of 1 to 2 cm, a width of 0.1 to 0.5 cm, and a height of 0.1 to 0.5 cm.

* * * * *